United States Patent [19]

Schrader et al.

[11] 4,049,131

[45] Sept. 20, 1977

[54] FREIGHT CONTAINER UNLOADING SYSTEM

[75] Inventors: William L. Schrader, Orchard Lake; Harold T. Rose, Sterling Heights, both of Mich.

[73] Assignee: The United States of America as represented by the Secretary of the Army, Washington, D.C.

[21] Appl. No.: 595,188

[22] Filed: July 11, 1975

[51] Int. Cl.[2] .............................................. B65G 63/00
[52] U.S. Cl. ................... 214/14; 214/38 CA; 238/10 R; 104/122; 104/135
[58] Field of Search ............. 214/12, 14, 38 R, 38 D, 214/517, 38 CA; 114/43.5 R; 238/10 R, 10 F; 212/5, 6, 13, 14; 104/122, 135

[56] References Cited

U.S. PATENT DOCUMENTS

| 267,795 | 11/1882 | McElroy | 214/14 X |
|---|---|---|---|
| 410,737 | 9/1889 | Ross | 214/14 X |
| 555,081 | 2/1896 | Emond | 104/135 |
| 642,373 | 1/1900 | Seymour et al. | 214/14 X |
| 766,392 | 8/1904 | Sayer | 214/14 X |
| 834,871 | 10/1906 | Clarke | 214/14 |
| 841,580 | 1/1907 | Schroeder | 214/14 |
| 1,362,488 | 12/1920 | Johnson | 214/14 X |
| 2,360,470 | 10/1944 | Brown | 214/38 CA |
| 2,409,400 | 10/1946 | Telford | 214/14 X |
| 2,715,371 | 8/1955 | Grossman | 104/135 |
| 2,894,650 | 7/1959 | Black et al. | 214/14 X |
| 2,981,210 | 4/1961 | Krueger | 214/38 D |
| 3,027,023 | 3/1962 | McGrath | 214/38 D X |
| 3,051,321 | 8/1962 | Ramsden | 212/14 |

Primary Examiner—Evon C. Blunk
Assistant Examiner—Jeffrey V. Nase
Attorney, Agent, or Firm—Peter A. Taucher; John E. McRae; Nathan Edelberg

[57] ABSTRACT

Mechanism for removing containerized freight from a beached watercraft and transporting same to a waiting tractor-trailer located on firm terrain. The mechanism is designed to transport heavy freight containers across muddy or loose sandy terrain without allowing the containers to sink or otherwise become bogged down in the terrain. Principal application is in military battlefield operations wherein it might sometimes be required to deliver containerized freight from large ships dispersed offshore to overland transport vehicals without the aid or necessity of sophisticated cranes and dock facilities.

4 Claims, 9 Drawing Figures

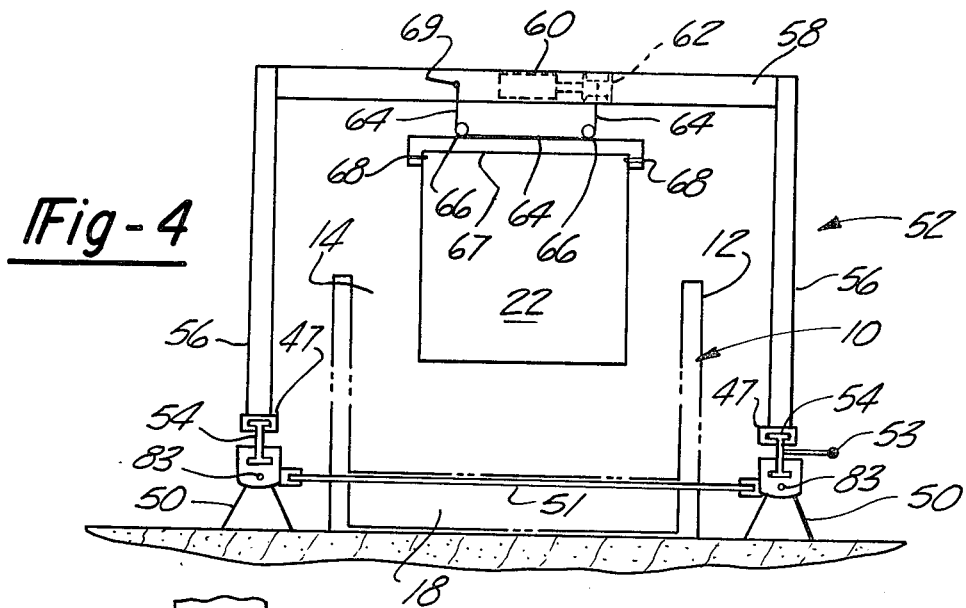
*Fig-4*
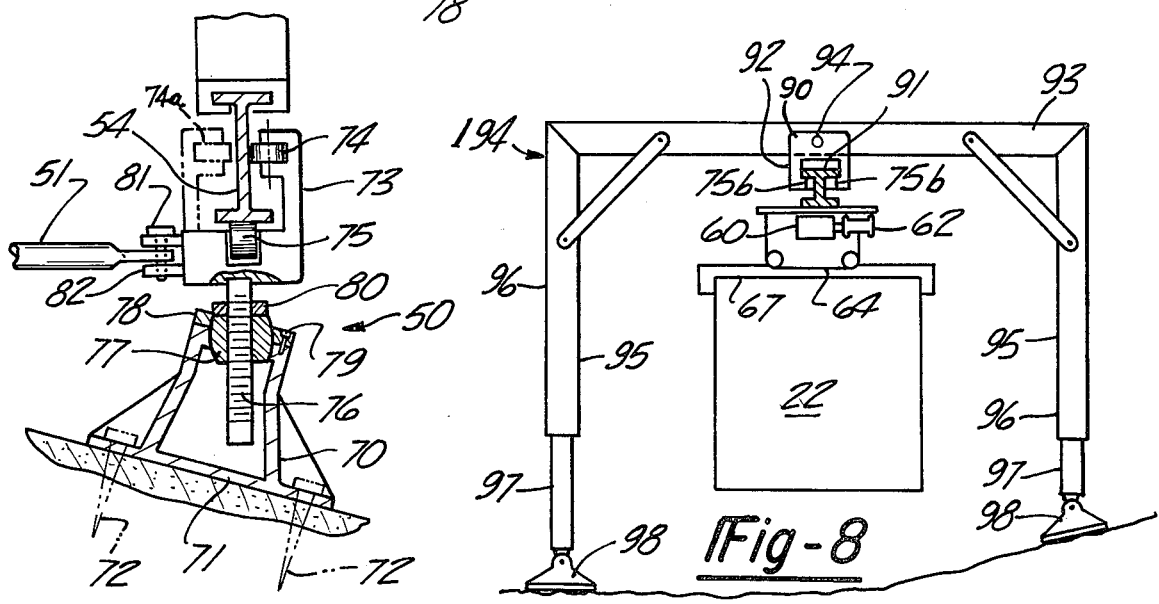
*Fig-5*
*Fig-8*
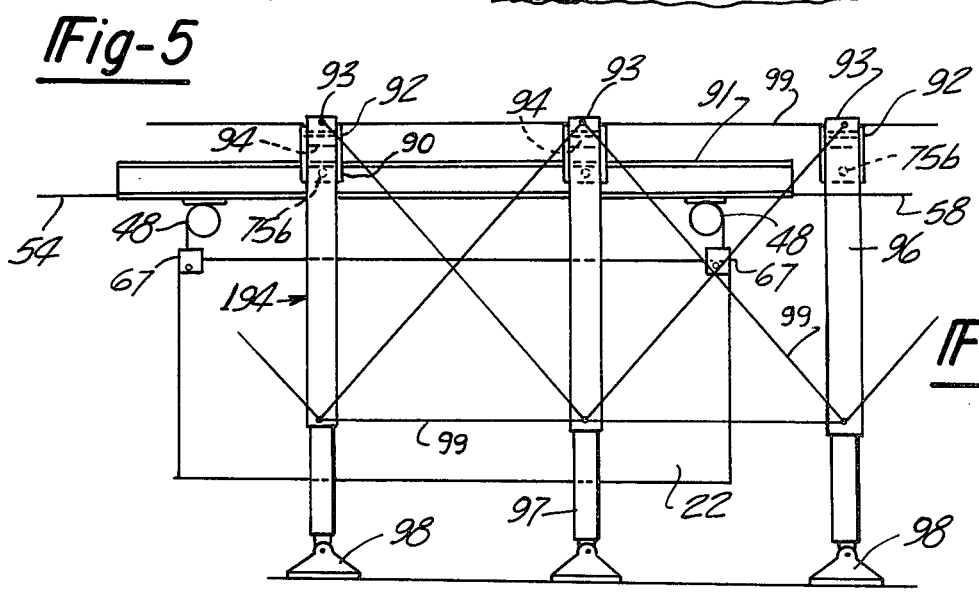
*Fig-7*

FREIGHT CONTAINER UNLOADING SYSTEM

The invention described herein may be manufactured, used and licensed by or for the Government for governmental purposes without payment to use of any royalty thereon.

BACKGROUND AND SUMMARY OF THE INVENTION

It is now fairly common to use the "containerized freight" concept when transporting cargo across the ocean. Normally special cranes are located at each port facility to load the individual freight containers onto the departing ship, and to remove said containers from the incoming ship. During wartime operations the existing cranes and docks might well be demolished by the enemy force. Therefore it would be desirable to devise some system for unloading freight containers from large seagoing ships even when the existing docks and crane facilities are damaged, demolished or inadequate.

The present invention is directed to a freight container unloading system useful in "beach" environments that lack permanent crane facilities. The system is designed in the form of "knockdown" components assemblable at the beach site to form a conveyor leading from a beached watercraft to a suitable waiting overland transport vehicle, e.g. a tractor-trailer. An aim of the invention is to provide an unloader system that is relatively simple so that it can be developed into the hardware stage with minimum time and expense. Another aim is to provide an unloader system that can be utilized in various beach environments (e.g. loose sandy soils or wet muddy soils or rough rocky soils) and various beach widths (measured from the beached watercraft to the waiting overland transport).

THE DRAWINGS

FIG. 1 schematically illustrates various previously-devised mechanisms for transporting containerized freight from a beached watercraft to a waiting vehicle.

FIG. 2 schematically illustrates one embodiment of the system devised under the present invention.

FIG. 4 is a view taken generally on line 4—4 in FIG. 3.

FIG. 5 illustrates certain details of an anti-friction sled support assembly used in the FIG. 2 system.

FIGS. 7 and 8 are views of another embodiment of the invention taken in the same directions as FIGS. 3 and 4.

FIG. 1 (PRIOR ART)

Figure 1:
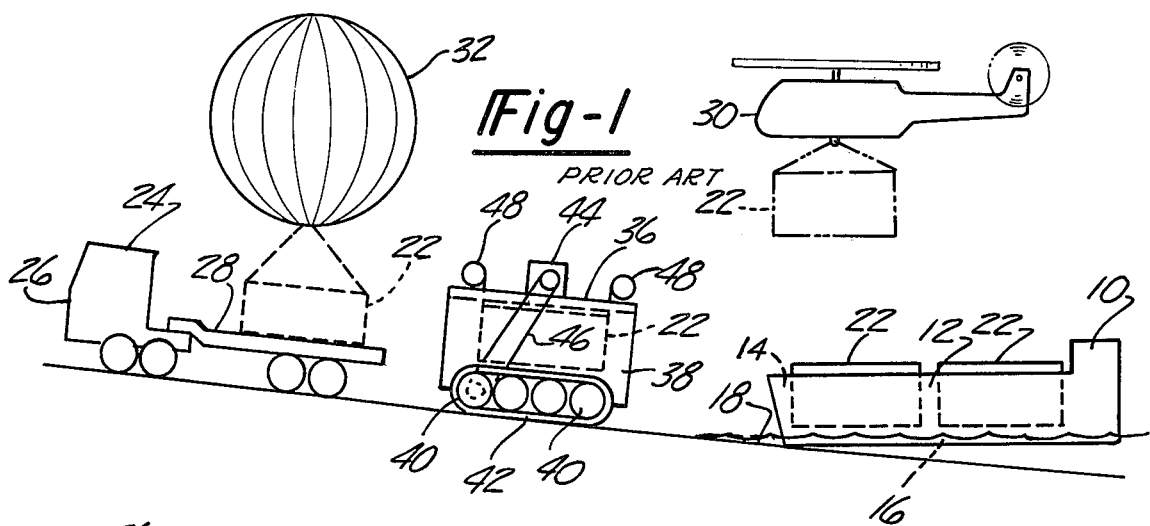

FIG. 1 illustrates a conventional open-topped "LCM" watercraft 10 beached at the water's edge (sea-land interface). The conventional craft comprises spaced side walls 12, a bottom wall 16, and a downwardly pivotable ramp 18; two freight containers 22 are shown positioned within a cargo space 14 of the watercraft. In practice each container might measure approximately 8 feet wide, 8 feet high and 20 feet long. When loaded, each container would weigh up to approximately 22 tons.

In a battlefield situation a number of larger container ships (not shown) would be located one or more miles offshore in dispersed positions offering the least target to the enemy force. LCM watercraft similar to craft 10 would shuttle back and forth between the large ships to deliver containerized freight to the beach area. Each large seagoing ship would be equipped with a crane for lowering individual containers into the LCM's.

At the beach area it is necessary to provide some unloader mechanism for transporting the individual containers from the beached LCM to a waiting overland vehicle such as the illustrated tractor-trailer unit shown at 26, 28.

The intervening soft beach area presents a transportation obstacle to conventional wheeled vehicles. To avoid or bypass this obstacle it has been proposed to utilize balloons or helicopters as transportation devices. For visualization purposes there is shown in FIG. 1 a helicopter 30 having a sling means for lifting a container from the larger ship (not shown) and later lowering it onto the bed of trailer 28; the helicopter in effect bypasses the LCM. Also shown is a balloon mechanism 32 for accomplishing this same function. The helicopter is relatively expensive, and is not readily available in a size sufficient to lift and transport a 22 ton payload; also the helicopter may experience some control difficulty in gently depositing a large heavy load onto the relatively small target provided by the bed of a trailer. The balloon presents many of the same difficulties as the helicopter. Another transport device, not shown in the drawing, is an air cushion vehicle; such a vehicle can run on water and also up over the beach area. However such a vehicle is relatively expensive and is not entirely satisfactory because it is unable to lift the freight container onto the bed of the trailer.

FIG. 1 illustrates another possible transport mechanism 34 of the "travelling tunnel" type, said mechanism comprising a vehicle having a roof 36 and two side walls 38 spaced apart a distance (span) greater than the width of the LCM watercraft. Located outboard of each side wall 38 are four wheels 40 and an endless terrain-engaging track 42 of the type commonly used on civilian bulldozers and military tanks. An engine 44, mounted on roof 36, is drivingly connected to one of the wheels at each side of the vehicle via a chain drive 46. Suitable hoists (winches) 48 are located at opposite ends of roof 36 to lift the freight container from the floor of the LCM when vehicle 34 is in a position straddling the watercraft. Engine 44 can be operated to move mechanism 34 to an unloader position straddling the bed of trailer 28 or other destination for the containerized cargo.

FIG. 2—PRESENT INVENTION

Figure 2:
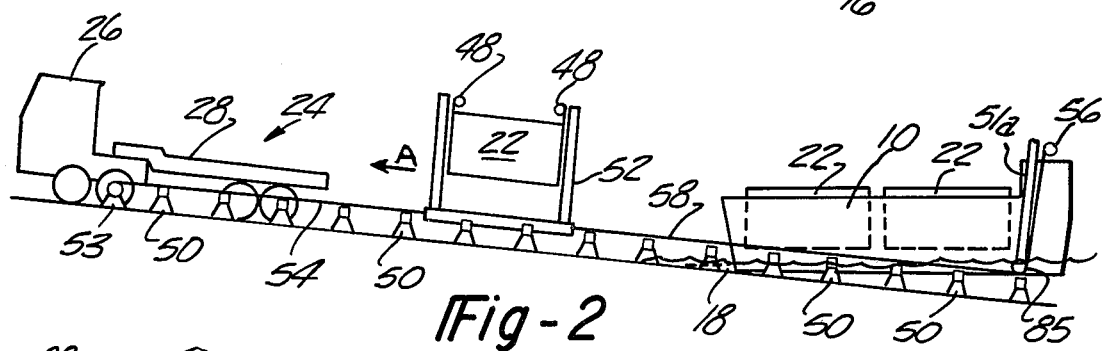

The present invention, as schematically illustrated in FIG. 2, comprises a number of pedestal-type support units 50 stationed at spaced points along a path leading from the beached watercraft 10 to the waiting vehicle 24. A movable sled 52 is momentarily or sequentially supported on successive ones of the support units 50 so that the sled can be towed in the arrow A direction from a first position straddling the LCM to a second position straddling vehicle 24. Conventional winch means 53 exerts a pulling force on cable 54 to tow the sled in the direction of vehicle 24. At another point in time a second winch means 56 exerts a pulling force on a cable 58 to tow the sled in the direction of the watercraft.

Sled 52 is equipped with hoists (winches) 48 for initially lifting the container from the watercraft, and later lowering the container onto the bed of trailer 28. Of course the system is "reversible" in the sense that it could be used to cause the containers to be moved from the trailer to the watercraft if so desired. In some cases the system might be used to transport loaded containers in one direction and unloaded containers in the opposite direction.

Figure 3:
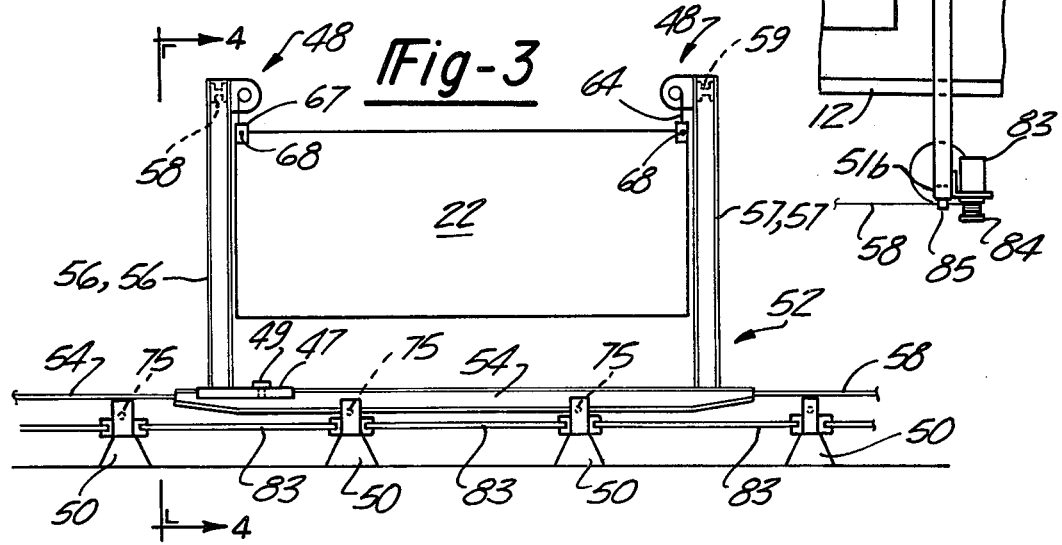
FIG. 3 shows in greater detail certain features used in the FIG. 2 system.

Referring especially to FIGS. 3 and 4, sled 52 is shown to include two horizontal rails (I-beams) 54 having upstanding front and rear posts 56 and 57 near their opposite ends. A beam 58 interconnects the front posts 56, and a similar beam 59 interconnects the rear posts 57. As seen in FIG. 4 the sled structure is of "tunnel" shape for straddling the watercraft 10 (and also the tractor-trailer).

Each of the aforementioned hoists 48 may be of conventional construction. As shown in FIG. 4, the representative hoist comprises a reversible electric motor 60 operating a drum 62 which winds or unwinds a cable 64 to lift or lower the associated end of the freight container. The cable runs under rollers 66 mounted on a conventional spreader bar 67, thence upward to an anchorage 69 on beam 59. Pins 68 releasably lock bar 67 to the container. The sled includes two hoist-spreader bar assemblies, one assembly at each end of the sled.

The aforementioned support units 50 are arranged in two parallel rows along the path leading from the watercraft 10 to the tractor-trailer 24 (FIG. 2). FIG. 3 is a fragmentary side elevational view showing the support units 50 in somewhat greater detail than FIG. 2; FIG. 4 shows the lateral spacing between the two rows of support units 50. As seen in FIG. 4, the support unit spacing provides a "docking" space that accommodates the LCM when it is in a beached condition. Certain tie rods 51 shown in FIG. 4 are used between selected ones of the support units; such tie rods are not used in the water area that accommodates the LCM, since they would obstruct the docking space.

The detailed construction of each support unit 50 is best seen in FIG. 5, which is an enlarged view taken in the same direction as FIG. 4. The base or pedestal 70 of the support unit provides a circular pad area 71 that is adapted to firmly seat on the terrain due to the weight of unit 50, perhaps augmented by anchoring pins 72 driven through suitable holes in the pad. Preferably the area of each pad 71 is sufficient to prevent appreciable sinking of unit 50 into the sandy terrain; in some cases a pad diameter of 30 inches might be sufficient.

Located above each pedestal 70 (FIG. 5) is a mounting unit 73 for two anti-friction rollers 74 and 75, said mounting unit being equipped with a downwardly extending jack means, shown as a screw 76. The screw extends through a nut 77 seated within a spherical cavity defined by base 70 and cap 78. Securement screws 79 can be tightened to force cap 78 to tighten its grip on the spherical outer surface of nut 77, thereby locking the roller mounting unit 73 in any selected position of adjustment about the sphere center. The objective is to dispose the roller mounting unit 73 in an upright orientation (i.e. with screw 76 in a vertical attitude) irrespective of the terrain slope, thereby preventing tip-over of the unit due to load application outboard or laterally offset from the unit's center of gravity.

Screw 76 serves as a jack for raising or lowering the roller mounting unit 73 relative to pedestal 70. A lock nut 80 may be provided to hold unit 73 in any given position. This height adjustment feature would be used principally to maintain a substantially straight-line relationship of the rollers in the various support units 50 irrespective of the presence of crests or valleys in the beach terrain.

Still referring to FIG. 5, there is shown in phantom a third roller 74a paralleling the illustrated roller 74. This third roller may or may not be necessary, depending on the rigidity of sled components 56 and 58. If the sled is sufficiently rigid rollers 74 should be sufficient to provide lateral guidance for the sled. The sled-container weight is borne by rollers 75.

The lateral spacing between the two rows of support units 50 (FIG. 4) is necessarily controlled to narrow limits in order that each sled rail 54 will align with each roller 75 (in the vertical plane). It is believed that the desired alignment can be achieved through the use of tie rods 51. As shown in FIG. 5, the representative tie rod is connected to the individual support unit by a removable pin 81 extendable through holes in the flattened end of the tie rod and in lugs 82 that are carried by unit 73. The opposite end of each tie rod would be connected to the companion support unit 50 in a similar fashion.

The spacing between the support units 50 in a given row is not as critical as the lateral spacing between the two rows. However the spacing of the support units in each row should be approximately constant to minimize the number of support units required for a given installation (i.e. given beach width). Therefore tie rods 83 are used to space the support units predetermined distances apart (see FIG. 3); lug-pin connections similar to that shown in FIG. 5 may be used for tie rods 83. Each support unit 50 is designed as a self-sustaining device. However the tie rods 51 and 83 would in practice exert anti-tilt forces on the units, thereby contributing to overall rigidity of the system.

The length of each tie rod 83 is preferably selected so that the spacing between adjacent support units 50 is approximately one half the length of container 22. For example, if the container has a length of 20 feet the support unit spacing in the FIG. 3 plane is about 10 feet. With this arrangement the sled will at all times be ensured of riding on at least four support units. If the support unit spacing in the FIG. 3 plane was increased the container-sled weight might at times be unevenly distributed on the rollers or applied to only two rollers instead of four; if the support unit spacing was decreased the number of support units would be excessive in some cases.

The "standard" size container 22 measures approximately 20 feet in length. On occasion freight is shipped in shorter containers only about 7 feet long. The illustrated sled structure is preferably designed as an adjustable device to accommodate the shorter containers. As illustrated in FIGS. 3 and 4 the adjustment function is achieved by slides 47 permanently affixed to the lower ends of posts 56. Each slide 47 is capable of adjustment along the upper flange of the associated rail 54 to vary the spacing between posts 56 and 57, thus accommodating the sled to containers of different length. During the actual lifting-transporting phase each slide 47 is rigidly anchored at a fixed point on its rail 54, as by means of a removable pin 49 extending through aligned openings in the slide and rail.

Figure 6:
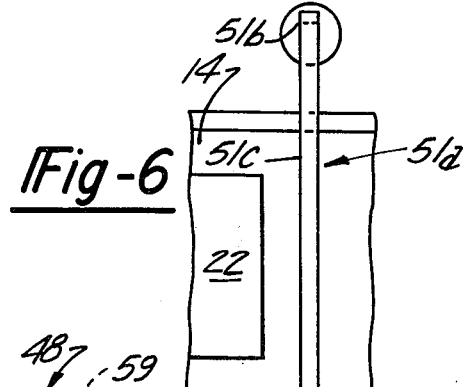
FIG. 6 is an enlarged fragmentary overhead top plan view of an "arch" used in the FIG. 2 system.

As previously noted, the space occupied by the watercraft should not be obstructed by lateral tie rods 51. If lateral tie rods are used they must either be embedded underground or constructed as overhead arches. FIG. 6 is a top plan view of an overhead tie rod arch 51a, comprising vertical posts 51b and an overhead cross beam 51c. The posts 51b would probably be anchored at their lower ends in sockets formed in "modified" support units constructed in the general fashion shown by FIG. 5.

The particular tie rod arch of FIG. 6 also functions as a mounting means for the aforementioned hoist 56. As shown, the hoist comprises an electric motor 83 and drum 84 which winds or unwinds the cable 58 in accordance with the desired direction of sled movement. The cable extends downwardly from drum 84 and around a guide roller 85 suitably mounted at the lower end of post 51b.

Figure 9:
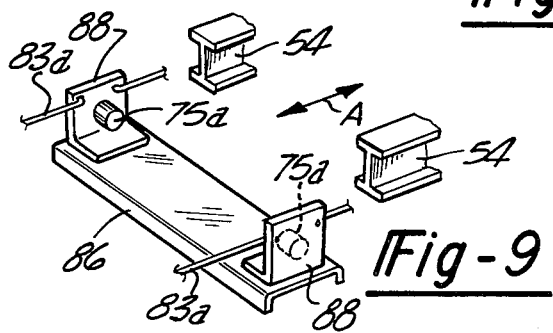
FIG. 9 is a perspective view of a transverse mat structure embodying features of the invention.

FIG. 9 illustrates a simplified support unit that might be used instead of the assembly depicted in FIG. 5. As shown in FIG. 9 the tie-rod function is provided by a channel-shaped mat 86 adapted to rest on the beach crosswise of the path A taken by the sled. At each end of the mat there is affixed an upstanding mounting bracket 88 for an anti-friction roller 75a. The spacing between brackets 88 is preselected so that the sled rails 54 ride on rollers 75a.

A number of the FIG. 9 assemblies would be placed on the beach along the path to be taken by the sled. Tie rods 83a might be used to obtain the desired spacing between adjacent ones of the assemblies.

MODIFICATION OF FIGS. 7 and 8

This embodiment of the invention employs a central overhead guidance for the sled in lieu of the laterally spaced guidance provided by support units 50 previously described. In this case the sled comprises a single I-beam 91 having its upper flange arranged to ride on rollers 75b in overhead anti-friction support units 92. Each support unit comprises spaced vertical plates 90 located on opposite side surfaces of a stationary cross beam 93. A pin 94 may be extended through the beam and aforementioned plates to swingably mount the respective unit 92 on the beam.

Beam 93 cooperates with legs 95 to form a stationary support arch 194. As shown in FIG. 8, each leg 95 of the arch comprises an upper tube 96 connected to beam 93 and a lower telescoping tube 97 pivotally connected to a pad or foot 98. Suitable lock devices (not shown) would be employed to lock tubes 96 and 97 in adjusted degrees of telescopment necessary to maintain beam 93 in a reasonably horizontal attitude. The telescoping adjustment would be sufficient to maintain successive ones of the beams 93 in essentially a straightline orientation in spite of any dips or crests along the path from the watercraft to trailer 24 (FIG. 2). Guy wires or rods 99 can be trained between adjacent ones of arches 194 to rigidify the system.

The height of each support arch 194 is sufficient so that sled 91 can be moved into the space directly above a container 22 located in the LCM. Hoists 48 at opposite ends of the sled are then actuated to lift the container to the elevated condition of FIG. 7. The system of arches 194 extends from the watercraft to the trailer. Each endmost arch is equipped with a winch (not shown) for exerting a pulling action on cable 54 or 58.

The spacing between adjacent ones of arches 194 is preferably slightly less than one half the length of container 22 for reasons discussed in connection with the support units 50 shown in FIG. 5. Each support arch 194 is necessarily a large structure in the erected condition; to minimize bulk while the arch system is being transported to the beach area each arch may be constructed as a "knockdown" unit. Therefore each leg 96 of each arch preferably has a detachable connection with the associated beam 93.

As seen in FIG. 8, the legs 96 are widely spaced apart by a distance greater than the width of the LCM (not shown). Such a wide spacing is necessary only at the areas where it is necessary that the arch straddle the LCM (or the bed of the trailer). In the other areas the spacing between legs 96 can be lessened to a dimension just slightly greater than the width of container 22. The leg spacing is controlled or varied by pre-selecting the length of beam 93.

PRINCIPAL ADVANTAGES OF THE SYSTEM

One advantage of the system (FIG. 3 or FIG. 7) is believed to be its relatively low development cost and quick development time. Thus, each prototype sled could be fabricated of standard rail components and hoist assemblies in a relatively short time period; also the prototype support units (50 or 86 or 92) could be fabricated and tested in a comparatively small time span. In contrast, a large helicopter or similar structure (such as a hovercraft) would require a considerable expenditure of time and money to reach the hardware stage.

The tracked vehicle 36 shown in FIG. 1 might be developed to the hardware stage in a reasonably short period of time. However tracked vehicles sometimes experience difficulties in traversing extremely soft terrain; in some beach environments the tracked vehicle might bog down or proceed only at minimal speed, especially after several passes over the same path. The wide span that a tracked vehicle would have to have for this operation would present some problems in regard to easy steering. On the other hand, if our presently-proposed support units are properly aligned on the beach we believe we can attain relatively high shuttle speeds without any steering problems. Under battlefield conditions such speeds might become important.

We wish it to be understood that we do not desire to be limited to the exact details of construction shown and described for obvious modifications will occur to a person skilled in the art.

We claim:

1. A transport system for moving a multi-ton freight container from a beached watercraft to a waiting vehicle located on firm terrain; said system comprising two parallel rows of anti-friction support units positionable on the beach at spaced points along a path leading from the beached watercraft to the waiting vehicle; the two rows of support units being spaced apart by a distance that is greater than the craft width or vehicle width; the support units having termination points alongside the beached watercraft and waiting vehicle; a sled of tunnel shape supported for translatory movement along the support units from a starting position straddling the watercraft to a delivery position straddling the waiting vehicle; hoist means carried by the sled for initially lifting the freight container from the watercraft and later lowering the freight container onto the waiting vehicle; and winch-cable means for towing the sled over successive ones of the anti-friction support units to thereby transport the container from the watercraft to the vehicle; each anti-friction support unit comprising a terrain-engageable pedestal, a roller-mount assembly (73) located above the pedestal, and a jack (76) operatively trained between the pedestal and roller-mount assembly for selectively locating the mounted roller at different elevations relative to the subjacent terrain.

2. The transport system of claim 1: each jack having tilt-adjustment capability relative to the associated pedestal, whereby when the pedestal is positioned on sloping terrain the jack can be adjusted to maintain the jack and roller-mount assembly in an upright operational attitude without substantial tendency to tip over due to lateral displacement of the unit center of gravity.

3. A transport system for moving a multi-ton freight container from a beached watercraft to a waiting vehicle located on firm terrain: said system comprising a number of anti-friction support units positionable on the beach at spaced points along a path leading from the beached watercraft to the waiting vehicle; each anti-friction support unit comprising an inverted U-shaped frame that is higher and wider than the watercraft and vehicle whereby the endmost ones of the inverted U-shaped frames straddle the watercraft and waiting vehicle; each anti-friction support unit including a roller carried by the bight portion of the inverted U-shaped frame; a sled in the form of an elongated rail ridable on the rollers for translatory movement from a starting position above the watercraft to a delivery position above the vehicle; hoist means carried by the sled rail for initially lifting the freight container from the watercraft and later lowering the container onto the waiting vehicle; and winch-cable means for towing the sled from the watercraft to the vehicle.

4. The transport system of claim 3: each inverted U-shaped frame being equipped with extensible legs, whereby the frames can be individually raised or lowered to operatively align the various sled-support rollers in spite of terrain undulations.

* * * * *